United States Patent
Wang

(10) Patent No.: US 9,479,825 B2
(45) Date of Patent: Oct. 25, 2016

(54) TERMINAL BASED ON CONDITIONAL ACCESS TECHNOLOGY

(75) Inventor: Xingjun Wang, Beijing (CN)

(73) Assignee: UNITEND TECHNOLOGIES INC., Beijing (CN)

( * ) Notice: Subject to any disclaimer, the term of this patent is extended or adjusted under 35 U.S.C. 154(b) by 441 days.

(21) Appl. No.: 14/111,183

(22) PCT Filed: Apr. 9, 2012

(86) PCT No.: PCT/CN2012/073651
§ 371 (c)(1),
(2), (4) Date: Nov. 27, 2013

(87) PCT Pub. No.: WO2012/139481
PCT Pub. Date: Oct. 18, 2012

(65) Prior Publication Data
US 2014/0082658 A1    Mar. 20, 2014

(30) Foreign Application Priority Data
Apr. 11, 2011  (CN) .......................... 2011 1 0089520

(51) Int. Cl.
*H04N 7/16*          (2011.01)
*H04N 21/4367*       (2011.01)
(Continued)

(52) U.S. Cl.
CPC .... *H04N 21/4367* (2013.01); *H04N 21/42623* (2013.01); *H04N 21/4405* (2013.01); *H04N 21/4408* (2013.01); *H04N 21/4623* (2013.01)

(58) Field of Classification Search
CPC ............... H04N 7/1675; H04N 7/163; H04N 21/4181; H04N 21/26606; H04N 21/435
USPC ..................................... 725/28–31
See application file for complete search history.

(56) References Cited

U.S. PATENT DOCUMENTS 7,920,701 B1    4/2011  Cox et al.
8,843,954 B2 *  9/2014  Guo ..................... H04L 63/0428
                                                                713/168
(Continued)

FOREIGN PATENT DOCUMENTS

CN    101282456 A    10/2008
CN    101355687 A    1/2009
(Continued)

OTHER PUBLICATIONS

Asghar, Muhammad Rizwan, Master's Thesis: DRM Convergence: Interoperability between DRM Systems, Eindhoven University of Technology, Aug. 2009—the whole document.
European Search Report on counterpart European application No. 12771528.2.

*Primary Examiner* — Jason Salce

(57) ABSTRACT

The terminal comprises a tuner, a security chip and a digital television terminal main chip. The tuner is used to receive cable television broadcast data through a cable for cable televisions, and transmit the received cable television broadcast data to the security chip. A key message required by CA is stored in the security chip. The security chip is used to extract stream media of a program needing to be played from the received cable television broadcast data, descramble the stream media according to the stored key message required by the CA, encrypt the descrambled stream media, and transmit the encrypted stream media to the digital television terminal main chip. The digital television terminal main chip is used to decrypt the received encrypted stream media, decode the decrypted stream media to obtain audio and video data, and output the audio and video data.

11 Claims, 3 Drawing Sheets

(51) Int. Cl.
*H04N 21/4405* (2011.01)
*H04N 21/4623* (2011.01)
*H04N 21/426* (2011.01)
*H04N 21/4408* (2011.01)

(56) References Cited

U.S. PATENT DOCUMENTS

2004/0228175 A1* 11/2004 Candelore .............. H04N 7/163
 365/158
2005/0100167 A1* 5/2005 Alve ...................... H04N 7/163
 380/277
2006/0109982 A1 5/2006 Puiatti et al.
2006/0156033 A1 7/2006 Desmicht et al.
2007/0294738 A1* 12/2007 Kuo ................... H04N 21/4263
 725/116
2008/0313463 A1 12/2008 Depietro et al.
2010/0266123 A1 10/2010 Tao

FOREIGN PATENT DOCUMENTS

| | | |
|---|---|---|
| CN | 101917589 A | 12/2010 |
| CN | 201674568 U | 12/2010 |
| CN | 101945248 A | 1/2011 |
| CN | 102164320 A | 8/2011 |
| KR | 20090045769 A | 5/2009 |
| WO | 0174003 A1 | 10/2001 |

* cited by examiner

TERMINAL BASED ON CONDITIONAL ACCESS TECHNOLOGY

FIELD OF THE INVENTION

The present invention relates to the field of digital television technologies, particularly to a Conditional Access (CA) technology, and more particularly to a terminal based on the CA technology.

BACKGROUND OF THE INVENTION

Cable television network is one of the most important network resources in social development in the future. Cable television technologies are facing the opportunities and challenges of digitalization, networking and informatization. Digitalization means that the signal of an information transmission tool is changed from an analog one to a digital one, networking means that public sharing of information resources is achieved, and informatization means that value-added extended services are provided to turn unidirectional broadcast into bidirectional interaction. Among these cable television technologies, the Conditional Access (CA) technology is a technical foundation to reach this goal and also the only way for development of the cable television technologies. Under a traditional CA technical framework, stream media are transmitted after encrypted, users cannot watch the stream media normally before a receiving end decrypts the received stream media properly, thus, the users are managed in this way, and signal stealing without authorization is prevented. With the CA technology, only authorized users are allowed to enjoy a certain service, which is not available to unauthorized users, consequently, normal profits of cable television value-added services can be ensured. A Conditional Access System (CAS) is exactly the system for implementing this function.

The core of the CAS lies in encryption and secure transmission of a Control Word (CW). The CW is generated randomly at the front end of the CAS that carries out transmission based on a Digital Video Broadcasting (DVB) standard, and the stream media of various services in a digital television system are scrambled according to the CW. The CW serving as a descrambling key, though randomly varying all the time, is still not secure enough, the entire CAS will become completely useless if the CW is cracked and read. To guarantee the security of the CW in the transmission process, the CW is encrypted using a Service Key (SK) to form an Entitlement Control Message (ECM). However, this SK can be acquired from any location, which means that subscribers of particular services and non-subscribers have the same right for program services, therefore, an Authentication Key (AK) must be used to protect the SK in an encryption way, the AK is stored in a smart card and is directly relevant to the program authority of a user. In order to provide different types of services at different levels, a plurality of AKs are assigned to each user by the CAS to meet abundant service requirements. The address message, entitlement message and other messages of a user are acquired from a user management system by the CAS, and combined with the CW-encrypted SK to form an Entitlement Management Message (EMM). The ECM and the EMM are inserted into stream media, which are processed by multiplexing and the like, and then transmitted to a set-top box. The set-top box, after receiving the scrambled stream media, acquires the encrypted ECM and EMM data information by demultiplexing, the ECM and EMM data are decrypted through the AK in the smart card to acquire the CW, and the stream media are restored by means of CW descrambling to finish the whole decryption procedure.

The architecture of the set-top box (i.e. the CA terminal in the prior art) in the prior art is as shown in FIG. 1. A set-top box 100 comprises a tuner 101 and a System on Chip (SoC) 107. To implement CA functions, the set-top box 100 is provided with an external smart card slot in which a smart card 108 is inserted. The SoC 107, which serves as a digital television terminal main chip, internally comprises a demultiplexer 102, a descrambler 103, a decoder 104, a CPU (Central Processing Unit) 105 and an AV (Audio/Video) output port 106, wherein the tuner 101 receives scrambled stream media and transmits the scrambled stream media to the SoC 107, the SoC 107 descrambles the stream media using the demultiplexer 102 and the descrambler 103, then transmits the descrambled stream media to the decoder 104 to obtain audio/video information, and outputs the audio/video information to a digital television through the AV output port 106; and while decoding, temporary data is stored in an external memory 109. It is required in descrambling of the stream media that, the CPU 105 acquires the EMM and the ECM from the demultiplexer 102 and transmits the EMM and the ECM to the off-chip smart card 108, the smart card 108 acquires the CW from the EMM and the ECM according to a decryption algorithm and then transmits the CW back to the CPU 105, and the CPU 105 writes the CW into the descrambler 103.

The components inside the SoC 107 (the demultiplexer 102, the descrambler 103 and the CPU 105) are connected with the external smart card 108 in an opening way, so such a connection way is liable to become a vulnerability for hacker attack, which mainly includes sharing of the control word (CW) and copying attack on the smart card, etc. In order to prevent copying attack on the CW, the CW in the CAS is updated on a regular basis (updated once every few seconds at most). However, in the case that the set-top box has bidirectional data interfaces (Ethernet, USB, etc.) and bidirectional applications (e.g. Internet access), a hacker is able to acquire the CW and transmit the CW to Internet or other public communication or broadcasting networks through the bidirectional interfaces quite easily, and the CW is then transmitted to piratical set-top boxes to realize the so-called CW network sharing and thus crack the CAS. For a storage application, the CW is stored together with audio/video streams and does not change any more, so there is no longer a protective meaning for the contents stored. In addition, the encryption/decryption algorithm of the smart card is also a target of hacker attack and piracy. The traditional CAS performs demultiplexing and CA descrambling in the SoC 107 and occupies the CPU 105 and a large space of the external memory 109, therefore, use of a simple and low-cost SoC is infeasible, which accordingly increases the cost of the set-top box. On the other hand, for a high-end SoC having bidirectional interfaces and the function of Internet access, the risk of CW sharing or CA cracking by a high-speed CPU arises, so the traditional CA architecture is also unsuitable for the increasingly-powerful SoC chips, hindering the development of SoC and digital television services.

To prevent hacker attack and improve the security of the CAS, it is widely adopted in the CA technology-providing companies (CA companies) that a powerful and complex barrier for system transplantation and authentication is set up, and these CA companies scrutinize the software codes and hardware design of the SoC 107 of the set-top box company to prevent vulnerabilities and backdoors from outside. But this will raise the transplantation cost of a set-top box greatly. Since more external content interaction services are added in new bidirectional, storage and USB external applications, there's a risk of copying or cracking programs from these corresponding external applications, thus degrading the security of the CAS dramatically.

SUMMARY OF THE INVENTION

Provided in the present invention is a secure implementation method based on a Conditional Access (CA) terminal, which can significantly improve the security of a Conditional Access System (CAS) at low cost.

Provided in the embodiments of the present invention is a terminal based on the Conditional Access (CA) technology, the terminal comprises a tuner, a security chip and a digital television terminal main chip;

the tuner is used to receive cable television broadcast data through a cable for cable televisions, and transmit the received cable television broadcast data to the security chip;

a key message required by CA is stored in the security chip; the security chip is used to extract stream media of a program needing to be played from the received cable television broadcast data, descramble the stream media according to the stored key message required by CA, encrypt the descrambled stream media, and transmit the encrypted stream media to the digital television terminal main chip;

the digital television terminal main chip is used to decrypt the received encrypted stream media, decode the decrypted stream media to obtain audio and video data, and output the audio and video data.

Preferably, the security chip comprises a demultiplexing module, a CA module, a secure storage module and a connection protection module;

the demultiplexing module is used to receive cable television broadcast data from the tuner, extract stream media of a program needing to be played from the received cable television broadcast data, and transmit the stream media to the CA module;

the CA module is used to descramble the received stream media according to a key message stored in the secure storage module, and output the descrambled stream media to the connection protection module;

the secure storage module is used to store the key message required by CA;

the connection protection module is used to encrypt the received stream media and then transmit the encrypted stream media to the digital television terminal main chip.

Preferably, the secure storage module is implemented by a one-time programmable memory, a flash or an erasable programmable read-only memory.

Preferably, the encryption/description algorithm used by the connection protection module is Advanced Encryption Standard (AES), Data Encryption Algorithm/Triple Data Encryption Algorithm (DES/3-DES), Unitend Copy Protection (UCP), User Datagram Protocol (UDP), High-bandwidth Digital Content Protection (HDCP) or Common Scrambling Algorithm (CSA).

Preferably, the security chip further comprises a Data Rights Management (DRM) module, used to carry out DRM service processing on data passing through the security chip.

Preferably, the DRM module supports China DRM, Marlin, Open Mobile Alliance (OMA) and/or Unitend Digital Right Management (UDRM).

Preferably, the security chip comprises at least one group of common transport stream (TS) interfaces, and the connection protection module transmits the encrypted media stream to the digital television terminal main chip via the common TS interfaces.

Preferably, the digital television terminal main chip comprises a demultiplexer, a descrambler, a decoder, a CPU and an AV output port;

the demultiplexer and the descrambler are used to receive the encrypted stream media from the security chip, decrypt the encrypted stream media, output the decrypted stream media to the decoder;

the decoder is used to decode the received stream media, and output audio and video data to the AV output port;

the CPU is used to control the demultiplexer, the descrambler and the decoder; and the AV output port is used to output the audio and video data outwards.

Preferably, the CPU of the digital television terminal main chip is further used to control the running process of the security chip.

Preferably, the digital television terminal main chip is further used to transmit data to the security chip via the common TS interfaces connected to the security chip, and then, the security chip transmits the data outwards via other data interfaces; or, the security chip transmits the data to the tuner via the common TS interfaces connected to the tuner, and then, the tuner transmits the data outwards.

Preferably, the DRM module is applied to home network protection, bidirectional service or storage service.

Preferably, the security chip further internally comprises a CPU, and the CPU in the security chip is used to implement one of the functions below or any combination thereof:

processing of relevant tasks involving security application and sensitive information;

upgrading of the CA and DRM algorithm; and security control on other modules inside the terminal and peripheral equipment outside the terminal.

It is thus clear from the aforementioned technical solution that, an external smart card is not needed in the terminal, and all the security-related processing is completed in the security chip in the terminal, which can prevent CW leakage and sharing effectively, and prevent leakage of security information and sensitive information; data connections between the security chip and other chips or devices are all put under the protection of a connection protection technology. In the technical solution of the present invention, there is no smart card and card seat, so the system reliability is enhanced and the cost of replacing the smart card is saved. The CA/DRM-implementing security of the terminal provided in the present invention is almost irrelevant to the SoC main chip of a set-top box or a digital television terminal, so the terminal in the present invention has strong adaptability and wide selection scope for the SoC main chip of a set-top box or a digital television terminal, that is to say, the SoC with the lowest cost can be used to reduce the cost of the set-top box, or the SoC of a high-end and high-speed CPU can be used as well to improve the flexibility, scope and diversity in applications; security is irrelevant to the SoC main chip of a set-top box or a digital television terminal, so the system in the present invention is capable of simplifying the flow and workload of system transplantation and authentication, which remarkably lowers the security threshold of hardware and even software, simplifies the commercial model of the CAS, saves the cash flow and operation cost of operators and lowers the threshold and cost of system transplantation and authentication.

DETAILED DESCRIPTION OF THE EMBODIMENTS

The CA terminal provided in the present invention comprises a tuner, a security chip and a digital television terminal main chip; compared with the CA terminal (i.e. set-top box) in the prior art, the CA terminal provided in the present invention does not need the external smart card, and instead, a security chip is additionally arranged. The tuner is used to receive cable television broadcast data through a cable for cable television, and transmit the received cable television broadcast data to the security chip; a key message required by CA is stored in the security chip; the security chip is used to extract stream media of a program needing to be played from the received cable television broadcast data, descramble the stream media according to the stored key message required by CA, encrypt the descrambled stream media, and transmit the encrypted stream media to the digital television terminal main chip; the digital television terminal main chip is used to decrypt the received encrypted stream media, decode the decrypted stream media to obtain audio and video data, and output the audio and video data.

For better clarity of the objective, technical solution and advantages of the present invention, the present invention will be described below in details with reference to the accompanying drawings and the embodiments.

Figure 2:
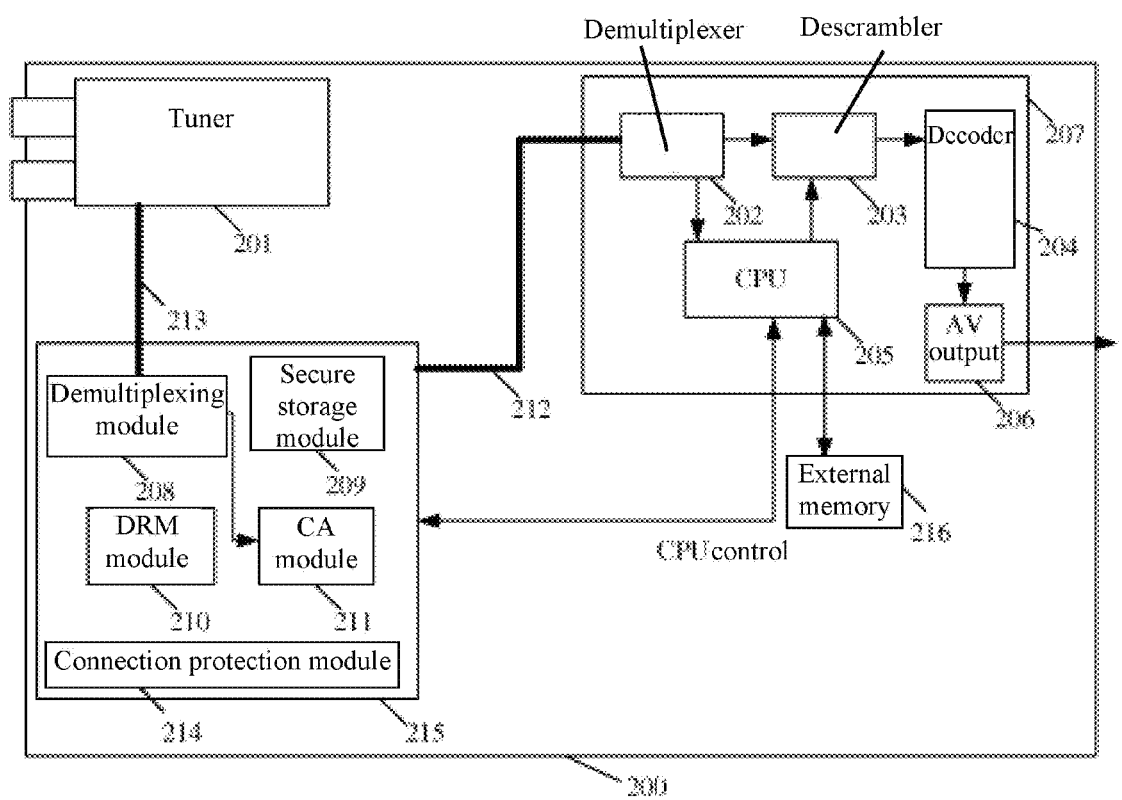
FIG. 2 is a schematic diagram of the internal structure of an improved CA and DRM terminal based on a security chip (ASIC, Application Specific Integrated Circuit) provided in embodiment 1 of the present invention.

The internal structure of an improved terminal based on a CA technology provided in embodiment 1 of the present invention is as shown in FIG. 2. A terminal 200 comprises a tuner 201 for communication, a security chip 215 and a digital television terminal main chip 207 for processing transmitted contents, wherein the security chip 215 may be fully packaged.

In this case, the tuner 201 is used to receive cable television broadcast data through a cable for cable televisions, and transmit the received cable television broadcast data to the security chip 215 for decryption; or the encrypted data output by the security chip 215 is transmitted out through the cable for cable televisions. An interface 213 between the tuner 201 and the security chip 215 may be a common transport stream (TS) interface.

The security chip 215 may be internally integrated with a CA module 211, a demultiplexing module 208 and a secure storage module 209, the demultiplexing module 208 is used to receive the cable television broadcast data from the tuner 201 and extract stream media of a program needing to be played from the received cable television broadcast data; the CA module 211 is used to descramble the stream media output by the demultiplexing module 208, wherein critical information involved in the security chip 215 and requiring confidentiality, such as keys and user information in various CASs, certificates and user information in a DRM system, various device keys, user keys, content keys, electronic currency and entitlement information, etc., are stored inside the secure storage module 209, and the secure storage module 209 may be a One-Time Programmable Memory (OTM MEMORY), a Flash, an Erasable Programmable Read-Only Memory ($E^2PROM$) or other memory media. The security chip 215 may be implemented by an Application Specific Integrated Circuit (ASIC).

Digitalized information has a characteristic of being easy to copy and spread, which determines that there must be a technology serving to protect the rights of digitalized audio/video program contents, and this technology is exactly Digital Rights Management (DRM). The working principle of the DRM technology is that, a digital program authorization center is established at first. Stream media files are encrypted using a Key provided by the digital program authorization center, and key identification (KeyID) and the Uniform Resource Locator (URL) of the digital program authorization center are stored in the packet header of the encrypted stream media files. When a user gives a program request, relevant keys can be delivered after authentication and authorization from the digital program authorization center according to the KeyID and URL information in the header, in order to decrypt the stream media files and then play corresponding media contents. Even if the DRM technology-protecting stream media files are downloaded and stored by users, they are unplayable without authentication and authorization from the digital program authorization center, thus, the rights of the stream media files are put under strict protection.

To further enhance the security of cable television programs, the security chip 215 may also comprise a DRM module 210. The DRM module 210 is used to carry out bidirectional or unidirectional DRM service on the stream media files. The DRM module 210 may be specifically a DRM module that supports China DRM, Marlin DRM, OMA DRM and UDRM.

China DRM is a DRM standard released by China DRM Forum (hereinafter referred to as China DRM), which was found on Nov. 24, 2004 and has already drawn up the *White Paper on China DRM Requirements*.

Marlin is an internationally-renowned open standard regarding content protection and content management, and has been widely used by content service providers and equipment manufacturers throughout the world. The next-generation digital content and right management technical regulations were developed at 2005 under the cooperation of Intertrust, Panasonic, Philips, Samsung and Sony.

OMA DRM is a digital right management technical standard developed by Open Mobile Alliance. OMA was initially created in June 2002, and the original OMA is established after merging of two standardization organizations, WAP Forum and Open Mobile Architecture.

UDRM (Unitend Digital Right Management): a DRM standard developed by Unitend Technologies Inc. independently.

The security chip 215 at least comprises one group of interfaces 212 connected with the digital television terminal main chip 207, the interfaces are protected by a connection protection module 214 and used to transmit the stream media descrambled by the security chip 215 to the digital television terminal main chip 207. The interfaces 212 may be common TS interfaces.

The encryption/description algorithm used by the connection protection module 214 is Advanced Encryption Standard (AES), Data Encryption Algorithm/Triple Data Encryption Algorithm (DES/3-DES), Unitend Copy Protection (UCP), User Datagram Protocol (UDP), High-bandwidth Digital Content Protection (HDCP), Common Scrambling Algorithm (CSA) or other algorithm systems. The security chip 215 may also be provided with other data interfaces, e.g. common TS interfaces, Universal Serial Bus (USB) interfaces, Serial Peripheral Interfaces (SPI), Ethernet interfaces, Wireless Local Area Network (WiFi/WLAN) interfaces, High Definition Multimedia Interface (HDMI) and the like, and these data interfaces are protected by the aforementioned connection protection module 214 as well.

Figure 1:
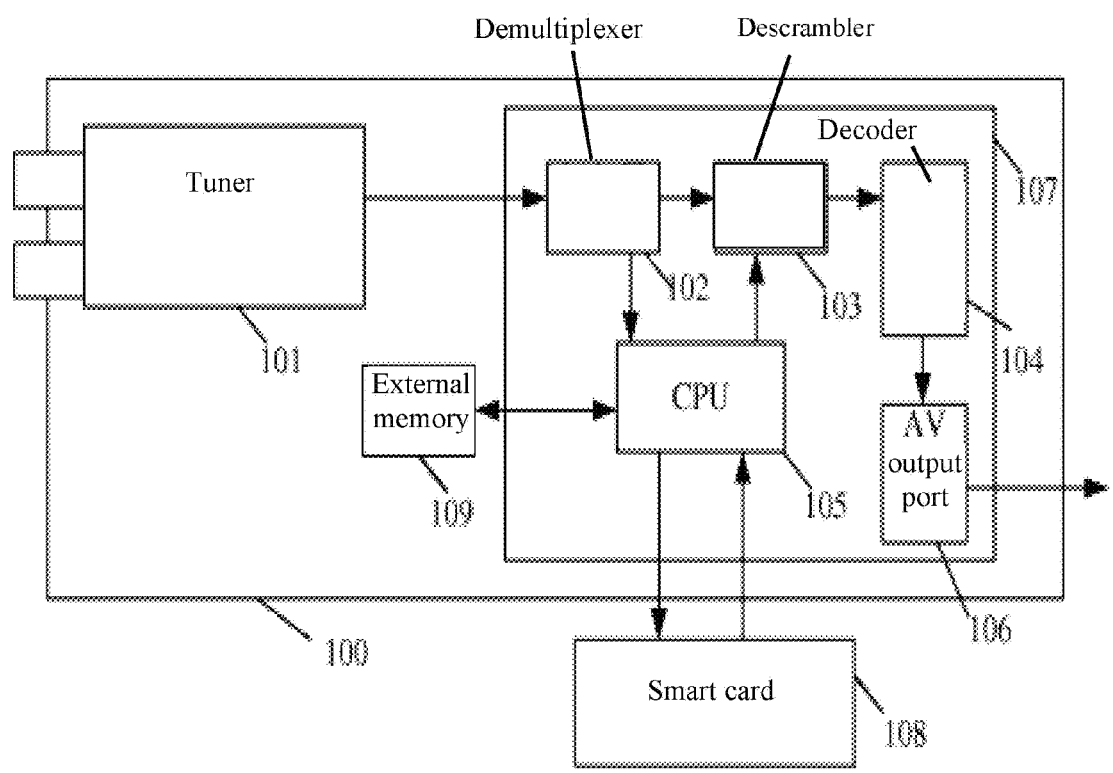
FIG. 1 is a schematic diagram of the internal structure of a traditional set-top box based on a CA technology.

The digital television terminal main chip 207 may comprise a demultiplexer 202, a descrambler 203, a decoder 204, a CPU (Central Processing Unit) 205 and an AV (Audio/Video) output port 206. It can be seen that, the internal structure of the digital television terminal main chip 207 is consistent with the structure of the digital television terminal main chip SoC 107 in the prior art, as shown in FIG. 1, therefore, the existing SoC chip can be used to reduce the cost. The demultiplexer 202 and the descrambler 203 are used to receive the stream media encrypted by the connection protection module 214 from the security chip 215, decrypt the encrypted stream media, and input the decrypted stream media to the decoder 204 for decoding to obtain audio and video data, and the audio and video data is output, through the AV output port 206, to a digital television for playing.

The CPU 205 in the digital television terminal main chip 207 controls the running process of the security chip 215, however, no transmission of sensitive information between the security chip and the CPU can be guaranteed.

The terminal 200 may also support bidirectional data transmission, therefore, the digital television terminal main chip 207 is further used to transmit data to the security chip 215 via the common TS interfaces connected to the security chip 215, and then, the security chip 215 transmits the data outwards via other data interfaces; or, the security chip 215 transmits the data to the tuner 201 via the common TS interfaces connected to the tuner 201, and then, the tuner 201 transmits the data outwards. The security of the transmitted contents can be ensured by connection protection and DRM during this transmission.

Figure 3:
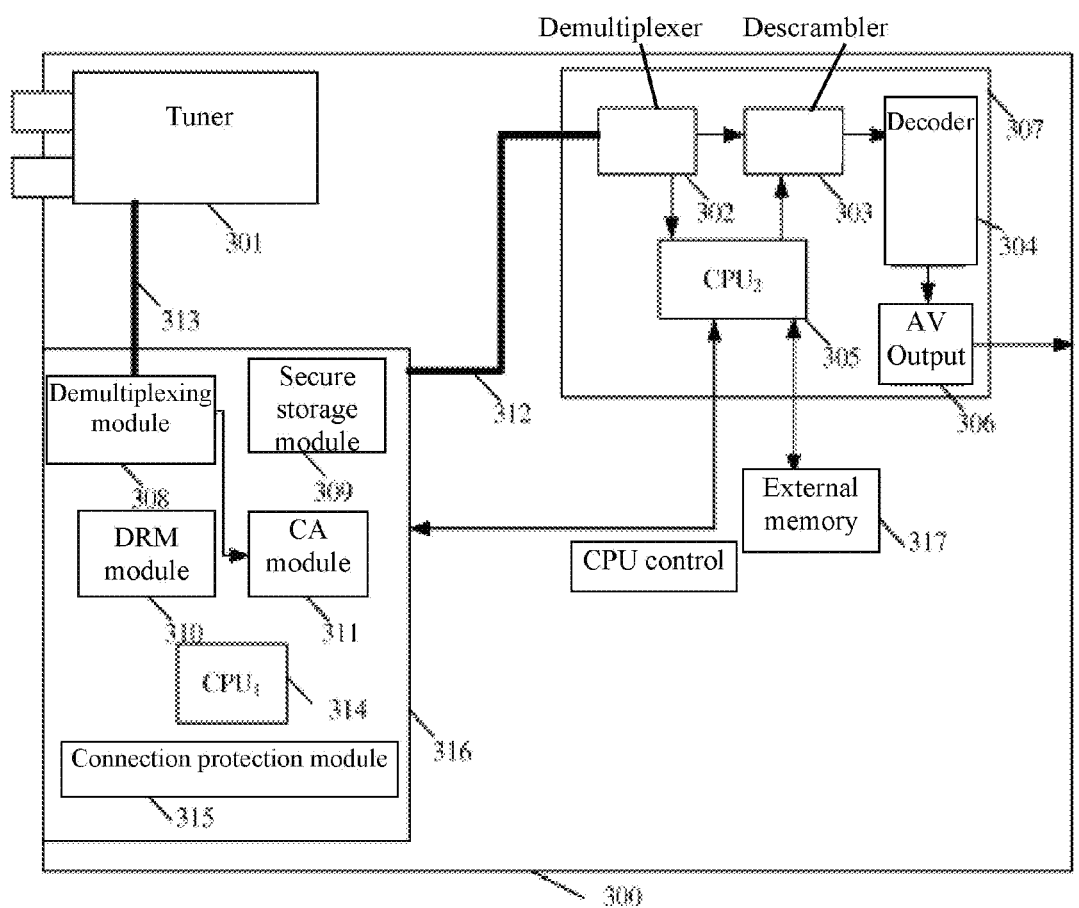
FIG. 3 is a schematic diagram of the internal structure of an improved CA and DRM terminal based on a security chip provided in embodiment 2 of the present invention.

The internal structure of an improved set-top box based on the CA technology provided in embodiment 2 of the present invention is as shown in FIG. 3. A set-top box 300 comprises a tuner 301 for communication, a fully-packaged security chip 316 and a digital television terminal main chip 307 for processing transmitted contents. The difference of this embodiment from embodiment 1 is that, both the security chip 316 and the digital television terminal main chip 307 are implemented by the SoC. A CPU$_1$ 314 (the CPU in the digital television terminal main chip 307 is CPU$_2$ 305) is also arranged in the security chip 316, and is capable of processing tasks relevant to security application and sensitive information, upgrading CA and DRM algorithms, and performing secure control on other modules inside the set-top box 300 and peripheral equipment outside the set-top box 300, for example, the CPU$_1$ 314 of the security chip can be used to control the tuner 301, or to control the peripheral equipment that is connected with the security chip through a connection protection module 315, e.g. USB card, network equipment, etc. The programs of the CPU$_1$ 314 may be stored either in a program storage area in a secure storage module 309, or in an external extended storage area 317 after being encrypted and signed, and encryption/decryption as well as signature authentication on the programs stored in the external extended storage area 317 are completed by a DRM module 310 in the security chip 316.

It is thus clear from the aforementioned technical solution that, the present invention has the beneficial technical effects below:

Security improvement: external smart card is not needed, and all the security-related processing is completed in the security chip in the terminal, which can effectively prevent CW leakage and sharing, leakage of security information and sensitive information, and set-top box piracy; data connections between the security chip and other chips or devices are all put under the protection of a connection protection technology, which is an architecture more secure than other existing CA or DRM architectures.

Reduction of system complexity: there is no smart card and card seat, so the system reliability is enhanced and the cost of replacing the smart card is saved.

The CA/DRM-implementing security of the terminal provided in the present invention is almost irrelevant to the SoC main chip of a set-top box or a digital television terminal, so the terminal in the present invention has strong adaptability and wide selection scope for the SoC main chip of a set-top box or a digital television terminal, that is to say, the SoC with the lowest cost can be used to reduce the cost of the set-top box, or the SoC of a high-end and high-speed CPU can be used as well to improve the flexibility, scope and diversity in application.

Security is irrelevant to the SoC main chip of a set-top box or a digital television terminal, so the system in the present invention is capable of simplifying the flow and workload of system transplantation and authentication, which remarkably lowers the security threshold of hardware and even software, simplifies the commercial model of the CAS, saves the cash flow and operation cost of operators and lowers the threshold and cost of system transplantation and authentication.

The connection protection technology and the DRM technology support equipment interface protection and home network management, and can support content management as well as authentication and authorization management on a plurality of home networks (e.g. Ethernet, WLAN/WiFi, and EoC, MOCA and HPAN of cable television coax network); and other set-top boxes, PCs, integrated digital televisions, handheld terminals, home media centers, media players and other equipment in a home network can also be managed through the security chip in the first digital television terminal.

The DRM module added supports bidirectional application and storage and other new services, e.g. content protection as well as authentication and authorization management for services like VOD (Video on Demand), push, time shift, PVR (Personal Video Recorder), super distribution, etc.

Described above are the preferred embodiments of the present invention only, which are not intended to limit the present invention, and any modifications, equivalent substitutions and improvements made within the spirit and principle of the present invention shall be incorporated within the scope of the present invention.

The invention claimed is:

1. A terminal based on a Conditional Access (CA) technology, the terminal comprises a tuner, a security chip and a digital television terminal main chip;

the tuner is used to receive cable television broadcast data through a cable for cable televisions, and transmit the received cable television broadcast data to the security chip, a key message required by CA is stored in the security chip; the security chip is used to extract stream media of a program needing to be played from the received cable television broadcast data, descramble the stream media according to the stored key message required by CA, encrypt the descrambled stream media, and transmit the encrypted stream media to the digital television terminal main chip; and the digital television terminal main chip is used to decrypt the received encrypted stream media, decode the decrypted stream media to obtain audio and video data, and output the audio and video data;

the security chip comprises at least one group of common transport stream (TS) interfaces;

characterized in that the digital television terminal main chip is further used to transmit data to the security chip via the common TS interfaces connected to the security chip, and then, the security chip transmits the data outwards via other data interfaces; or, the security chip transmits the data to the tuner via the common TS interfaces connected to the tuner, and then, the tuner transmits the data outwards.

2. The terminal according to claim 1, characterized in that the security chip comprises a demultiplexing module, a CA module, a secure storage module and a connection protection module;

the demultiplexing module is used to receive cable television broadcast data from the tuner, extract stream media of a program needing to be played from the received cable television broadcast data, and transmit the stream media to the CA module;

the CA module is used to descramble the received stream media according to a key message stored in the secure storage module, and output the descrambled stream media to the connection protection module;

the secure storage module is used to store the key message required by CA; and the connection protection module is used to encrypt the received stream media and then transmit the encrypted stream media to the digital television terminal main chip.

3. The terminal according to claim 2, characterized in that the secure storage module is implemented by a one-time programmable memory, a flash or an erasable programmable read-only memory.

4. The terminal according to claim 2, characterized in that the encryption/description algorithm used by the connection protection module is Advanced Encryption Standard (AES), Data Encryption Algorithm/Triple Data Encryption Algorithm (DES/3-DES), Unitend Copy Protection (UCP), User Datagram Protocol (UDP), High-bandwidth Digital Content Protection (HDCP) or Common Scrambling Algorithm (CSA).

5. The terminal according to claim 2, characterized in that the security chip further comprises a Data Rights Management (DRM) module, used to carry out DRM service processing on data passing through the security chip.

6. The terminal according to claim 5, characterized in that the DRM module supports China DRM, Marlin, Open Mobile Alliance (OMA) and/or UDRM.

7. The terminal according to claim 2, characterized in that the connection protection module transmits the encrypted media stream to the digital television terminal main chip via the common TS interfaces.

8. The terminal according to claim 1, characterized in that the digital television terminal main chip comprises a demultiplexer, a descrambler, a decoder, a CPU and an AV output port;

the demultiplexer and the descrambler are used to receive the encrypted stream media from the security chip, decrypt the encrypted stream media, output the decrypted stream media to the decoder;

the decoder is used to decode the received stream media, and output audio and video data to the AV output port;

the CPU is used to control the demultiplexer, the descrambler and the decoder; and the AV output port is used to output the audio and video data outwards.

9. The terminal according to claim 8, characterized in that the CPU of the digital television terminal main chip is further used to control the running process of the security chip.

10. The terminal according to claim 5, characterized in that the DRM module is applied to home network protection, bidirectional service or storage service.

11. The terminal according to claim 5, characterized in that the security chip further internally comprises a CPU, and the CPU in the security chip is used to implement one of the functions below or any combination thereof:

processing of relevant tasks involving security application and sensitive information;

upgrading of CA and DRM algorithm;

security control on other modules inside the terminal and peripheral equipment outside the terminal.

\* \* \* \* \*